H. McTAVISH.
FOLDING EGG CRATE.
APPLICATION FILED OCT. 19, 1917.
1,288,434.
Patented Dec. 17, 1918.
2 SHEETS—SHEET 1.
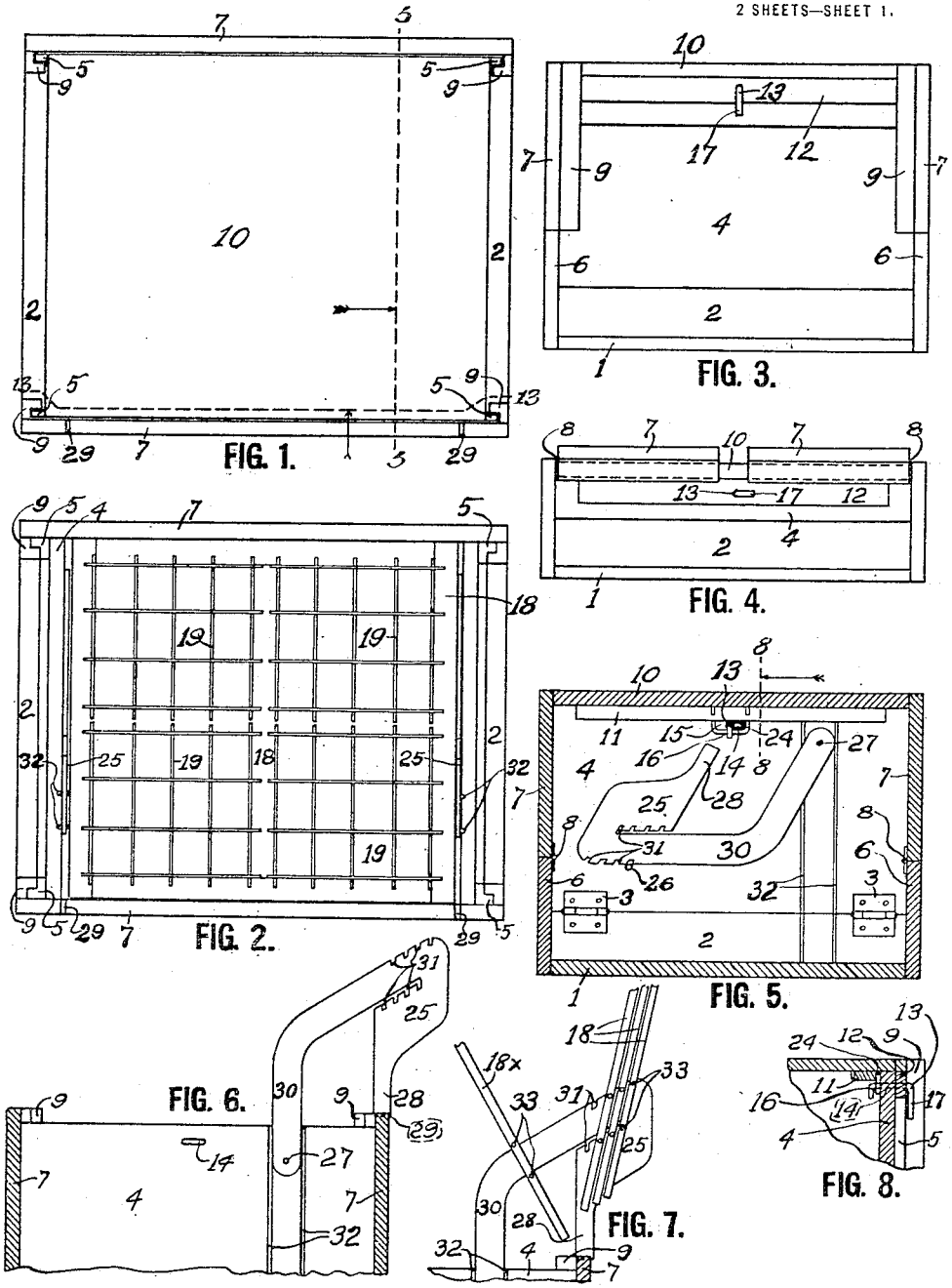
INVENTOR:
HARRY McTAVISH
BY HIS ATTORNEY:
A. M. Carlsen H. McTAVISH.
FOLDING EGG CRATE.
APPLICATION FILED OCT. 19, 1917.

1,288,434.

Patented Dec. 17, 1918.
2 SHEETS—SHEET 2.

INVENTOR:
HARRY McTAVISH
BY HIS ATTORNEY:
A. M. Carlsen.

UNITED STATES PATENT OFFICE.

HARRY McTAVISH, OF ELDON, PRINCE EDWARD ISLAND, CANADA.

FOLDING EGG-CRATE.

1,288,434.                 Specification of Letters Patent.     Patented Dec. 17, 1918.

Application filed October 19, 1917.   Serial No. 197,406.

*To all whom it may concern:*

Be it known that I, HARRY McTAVISH, a subject of the King of Great Britain, residing at Eldon, in the province of Prince Edward Island, Canada, have invented a new and useful Folding Egg-Crate, of which the following is a specification.

My invention relates to folding egg crates, and the object is to provide a cheap, simple but strong and durable shipping crate, which when empty may be folded so as to occupy but little space during its return to the shipping point, where it may be filled and shipped again.

In the accompanying drawing;—

Figure 9:
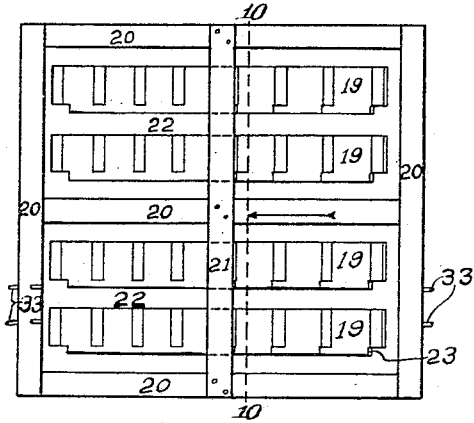
Figure 11:
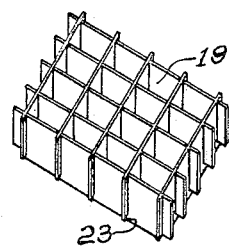
Figure 12:
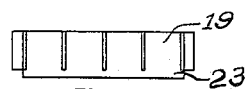
Figure 10:
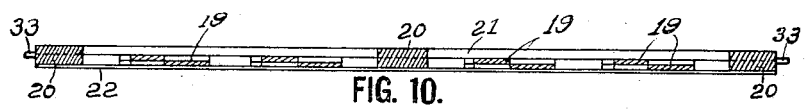
Figure 13:
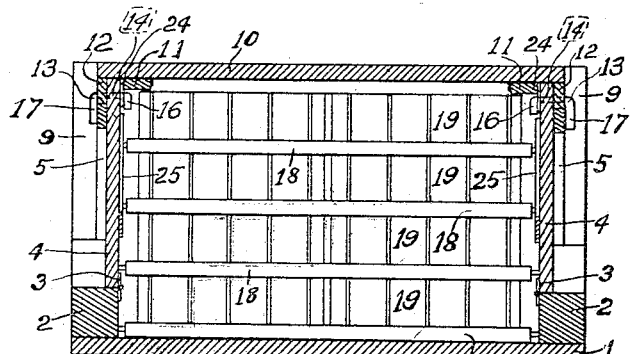

Figure 1 is a top view of a shipping box set up and closed and embodying my invention. Fig. 2 is also a top view of the crate embodying my improvements, but with the cover removed. Fig. 3 is an end view of the crate as shown in Fig. 1. Fig. 4 is an end view of the crate when in folded position. Fig. 5 is a sectional view on the line 5—5 in Fig. 1. Fig. 6 is a portion of Fig. 5 with the cover omitted and the arm 30 swung to its upper position. Fig. 7 is a portion of Fig. 6 showing also how the trays 18 are supported as the crate is being emptied. Fig. 8 is a fragmentary sectional view as on line 8—8 Fig. 5 showing the cover-securing means. Fig. 9 is a top view of one of the egg carrying trays, showing how the empty egg combs may be folded and placed in the tray by sliding them under the cross bar 21 of the tray. Fig. 10 is a section on the line 10—10 Fig. 9 on an enlarged scale. Fig. 11 is a perspective and Fig. 12 a side view of one of the egg combs, showing certain improvements over egg combs generally used in shipping cases and crates. Fig. 13 is a sectional view on the line 13—13 in Fig. 1.

Referring to the drawings by reference numerals, 1 designates the bottom of the box. Upon each end of the bottom is secured a transverse cleat 2, and at the inner edge thereof is fastened by hinges 3 one of the inwardly foldable sections 4 of the box. Said end sections are at each end provided with a cleat 5.

The sides of the box are each composed of a lower and an upper section; the lower section 6 is rigidly fixed to the bottom and the upper and larger section 7 is hinged at 8 (see Fig. 5) to the upper edge of the fixed section, to fold inward as shown in Fig. 4. At the ends of each section 7 are fixed two, in cross section L-shaped, cleats 9, which together with the section form grooves into which the cleats 5 of the end sections pass when the box is set up. In such vertical position the side sections 7 are held by the top piece or cover 10, which is inserted between them and rests upon the top edges of the end sections 4, and the latter sections are prevented from folding inwardly by cleats 11 fixed at the under side of and near each end of the cover. On the under side of the ends of the cover are also secured two cleats 12 (see Figs. 3 and 13) between which and the cleats 11 are formed two grooves which engage the top edges of the end sections 4, 4. Each end of the cover is held in this position by means of a securing device which is clearly shown in Figs. 5, 8 and 13 to consist of a wire pin 13 the ends of which are bent at right angles to form a catch 16 and a finger hold 17. The pin is slidably held in a hole in the end cleat 12 of the cover and adapted to have its catch 16 passed through a slot 14 in the end section 4 of the box and engaged in a staple 24 fixed on the inner cleat 11 of the cover (see Figs. 5 and 8).

When the inner right angle part 16 of the securing wire 13 is turned to a horizontal position by means of its finger catch 17 the catch 16 becomes disengaged from the staple so it may be pulled out of the slot 14 and thus leave the cover loose for removal. When it is desired to close the crate the cover is again placed in position the pins 13 are inserted in the slots 14 and staples 24 and there given a quarter turn downward, (as shown in Fig. 5).

The crate is provided with four or more trays 18 each of which supports four or more egg combs 19. The trays are made of wooden skeleton frames 20, 21 and have a thin wood or cardboard bottom 22. The cross piece 21 is a thin strip of wood so secured (see Fig. 10) as to leave an opening between itself and the bottom 22. The empty egg combs can then be folded together and inserted in the said opening (see Figs. 9 and 10) until they are again to be used. The combs are so made that when they are to be set up their reduced bottom portions 23 (see Figs. 9, 11 and 12) will snugly fit in between the frame work 20, 21 of the trays.

Pivotally mounted at 27 one to each of the end sections 4, are two directly opposite brackets 25 of the shape and construction clearly shown in Figs. 5, 6 and 7. When said brackets are swung down they may rest on pins 26. But when the crate is opened they are swung up on the pivots 27 until the ends 28 reach and snugly fit into the notches 29 (see Figs. 1 and 6) in the side sections 7. The arm 30 of the bracket is curved, as shown, but its width remains the same the entire distance from the pivot 27 to the notches 31. This width is also maintained between two vertical grooves 32 in each of the end sections 4. The purpose of these grooves and the arm 30 of the bracket is to guide pegs 33 of the trays 18; and after said trays are raised to the desired position they rest with their pegs 33 in the notches 31. The object of doing this is to place the empty trays out of the way without losing them.

The brackets, resting in the notches 29 serve also to hold the end sections 4 up against falling inward as did the cover before it was removed, and thus the crate is rigid whether the cover is in place or not.

Thus it will be seen that when a crate of eggs is to be sold, the cover is removed and the brackets 25 set up in position. Then as the egg combs are emptied they may be folded together and placed in the trays. As the trays become emptied they are raised up out of the way, as shown in Fig. 7. When the crate or case becomes empty the trays are lifted out of the notches and slid down to the bottom of the crate. The brackets are swung down, the end sections are folded in, and the cover of the crate is then placed on top of them. The side sections are then folded down over all, as shown in Fig. 4, and the case is ready to be shipped back for refilling.

Having now fully described my invention, what I claim and desire to protect by Letters Patent is:

In a foldable egg case for shipping eggs, the combination with a bottom and sides and end sections hinged thereto, the latter section having each a pair of vertical grooves, a bracket pivoted to each end section between said grooves and having a curved flat arm equal in width to the space between the grooves, one of the side sections having in its upper edge notches for said brackets to rest in when they are swung to their upper positions, said brackets having in their upper portion several notches, a series of egg trays adapted to occupy a spaced position above each other in the case, said trays having at each end a pair of pegs serving to guide the movement of the trays by being engaged partly by the grooves and partly by the opposite edges of the bracket; said pegs being arranged to rest in the notches in the upper part of each bracket and thereby hold the raised trays out of the way for the next tray to be raised out of the case, and foldable egg combs removably engaged with the trays and means on the end sections for supporting the brackets when they are folded into the case.

In testimony whereof I affix my signature.

HARRY McTAVISH. [L. S.]

Copies of this patent may be obtained for five cents each, by addressing the "Commissioner of Patents, Washington, D. C."